United States Patent
Nakajima et al.

(10) Patent No.: US 12,218,577 B2
(45) Date of Patent: Feb. 4, 2025

(54) POWER CONVERSION DEVICE AND CONTROL DEVICE HAVING OVERCURRENT SUPPRESSION

(71) Applicant: TOSHIBA MITSUBISHI-ELECTRIC INDUSTRIAL SYSTEMS CORPORATION, Tokyo (JP)

(72) Inventors: Tatsuhito Nakajima, Tokyo (JP); Yasuaki Mitsugi, Tokyo (JP); Tomoya Katsukura, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 247 days.

(21) Appl. No.: 17/923,230

(22) PCT Filed: Mar. 25, 2021

(86) PCT No.: PCT/JP2021/012721
§ 371 (c)(1),
(2) Date: Nov. 4, 2022

(87) PCT Pub. No.: WO2022/201470
PCT Pub. Date: Sep. 29, 2022

(65) Prior Publication Data
US 2023/0188030 A1 Jun. 15, 2023

(51) Int. Cl.
*H02M 1/32* (2007.01)
*H02M 7/44* (2006.01)

(52) U.S. Cl.
CPC .......... *H02M 1/32* (2013.01); *H02M 7/44* (2013.01)

(58) Field of Classification Search
CPC ................. H02M 1/32; H02M 7/44
See application file for complete search history.

(56) References Cited

U.S. PATENT DOCUMENTS

| | | | |
|---|---|---|---|
| 10,797,615 B2 * | 10/2020 | Chhabra | H02M 1/126 |
| 2015/0280546 A1 * | 10/2015 | Kouno | H02M 1/36 363/132 |
| 2020/0204057 A1 * | 6/2020 | Kato | H02M 7/53871 |

FOREIGN PATENT DOCUMENTS

| CN | 103532423 A | * | 1/2014 |
|---|---|---|---|
| CN | 109378799 A | | 2/2019 |

(Continued)

OTHER PUBLICATIONS

International Search Report and Written Opinion mailed on Jun. 8, 2021, received for PCT Application PCT/JP2021/012721, filed on Mar. 25, 2021, 8 pages including English Translation.

(Continued)

Primary Examiner — Harry R Behm
(74) Attorney, Agent, or Firm — XSENSUS LLP (57) ABSTRACT

A power conversion device is provided, and includes a major circuit part, and a control device; the major circuit part includes a power conversion part converting, into AC power, power that is input, and a filter circuit causing the AC power output from the power conversion part to approach a sine wave; the control device controls power conversion by the major circuit part by controlling an operation of the power conversion part; the control device includes an overcurrent suppression controller; the overcurrent suppression controller calculates instantaneous value voltage output command values of the phases of the AC power output from the power conversion part to suppress an overcurrent at the output end of the major circuit part. Accordingly, a power conversion device and a control device of the power conversion device are provided in which the generation of an overcurrent can be suppressed even when a voltage-controlled operation is performed.

3 Claims, 3 Drawing Sheets

(56) References Cited

FOREIGN PATENT DOCUMENTS

JP        2020-198705 A     12/2020
KR           2244870 B1 *    4/2021

OTHER PUBLICATIONS

Extended European search report issued on Nov. 13, 2024, in corresponding European patent Application No. 21933075.0, 11 pages.
Konstantinos O. Oureilidis et al., "Fault detection and clearing control strategy in an islanded microgrid with converter-interfaced sources", 2017 IEEE Manchester Powertech, IEEE, Jun. 18, 2017, total 6 pages.
Baoze Wei et al., "Overload and Short-Circuit Protection Strategy for Voltage Source Inverter-Based UPS", IEEE Transactions on Power Electronics, vol. 34, No. 11, Nov. 1, 2019, pp. 11371-11382, total 12 pages.

* cited by examiner

POWER CONVERSION DEVICE AND CONTROL DEVICE HAVING OVERCURRENT SUPPRESSION

CROSS-REFERENCE TO RELATED APPLICATION

The present application is based on PCT filing PCT/JP2021/012721, filed Mar. 25, 2021, the entire contents of which are incorporated herein by reference.

FIELD

Embodiments described herein relate generally to a power conversion device and a control device.

BACKGROUND ART

A voltage source voltage-controlled power conversion device (a Grid forming inverter) is known. Compared to a voltage source current-controlled power conversion device (a Grid following inverter), a voltage source voltage-controlled power conversion device can enable a seamless transition between a system-connected operation and an isolated operation.

However, when the power conversion device has a voltage-controlled operation, there is a possibility that an instantaneous potential difference occurring due to an abrupt change of the system voltage, etc., may undesirably generate an overcurrent in the power conversion device and cause failure of components inside the power conversion device such as switching elements, etc.

It is therefore desirable to be able to suppress the generation of an overcurrent in a power conversion device and the control device of the power conversion device even when a voltage-controlled operation is performed.

PRIOR ART DOCUMENTS

Patent Documents

[Patent Document 1]
JP-A-2020-198705

SUMMARY OF INVENTION

Technical Problem

Embodiments of the invention provide a power conversion device and a control device of the power conversion device that can suppress the generation of an overcurrent even when a voltage-controlled operation is performed.

Solution to Problem

According to an embodiment of the invention, a power conversion device is provided, and includes a major circuit part, a control device, a first measurement device, and a second measurement device; the major circuit part includes a power conversion part converting, into AC power, power that is input, and a filter circuit causing the AC power output from the power conversion part to approach a sine wave; the control device controls power conversion by the major circuit part by controlling an operation of the power conversion part; the first measurement device measures a line current of each phase and a phase voltage of each phase of the AC power output from the power conversion part; the second measurement device measures a line current of each phase and a phase voltage of each phase of AC power output from the major circuit part, active power at an output end of the major circuit part, and reactive power at the output end of the major circuit part; the control device includes a command value calculation part and an overcurrent suppression controller; the command value calculation part receives input of an active power command value and a reactive power command value and receives input of measured values of the active power and the reactive power of the output end of the major circuit part; the command value calculation part calculates a phase voltage phase command value of the AC power output from the major circuit part based on the active power command value and the measured value of the active power; the command value calculation part calculates a phase voltage amplitude command value of the AC power output from the major circuit part based on the reactive power command value and the measured value of the reactive power; the overcurrent suppression controller calculates instantaneous value voltage output command values of the phases of the AC power output from the power conversion part to suppress an overcurrent at the output end of the major circuit part by using all of input information of the phase voltage phase command value, the phase voltage amplitude command value, the measured values of the phase voltages and the line currents of the AC power of the power conversion part, and the measured values of the phase voltages and the line currents of the AC power of the major circuit part; and the control device controls the operation of the power conversion part so that voltages corresponding to the calculated instantaneous value voltage output command values are output from the power conversion part.

Advantageous Effects of Invention

According to embodiments of the invention, a power conversion device and a control device of the power conversion device are provided in which the generation of an overcurrent can be suppressed even when a voltage-controlled operation is performed.

DESCRIPTION OF EMBODIMENTS

Embodiments will now be described with reference to the drawings.

The drawings are schematic and conceptual; and the relationships between the thicknesses and widths of portions, the proportions of sizes among portions, etc., are not necessarily the same as the actual values. Also, the dimensions and proportions may be illustrated differently among drawings, even for identical portions.

In the specification and drawings, components similar to those described previously or illustrated in an antecedent drawing are marked with the same reference numerals; and a detailed description is omitted as appropriate.

Figure 1:
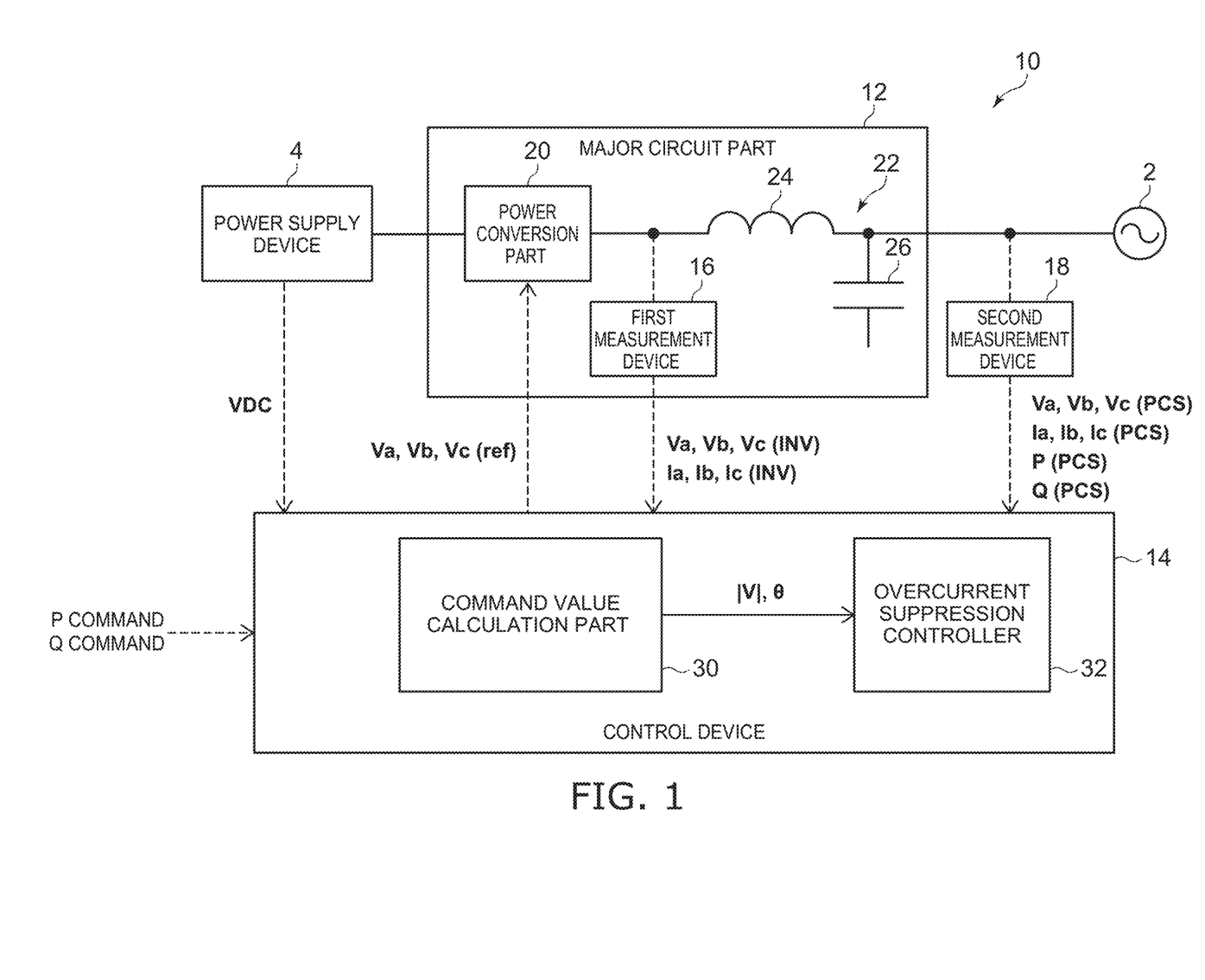
FIG. 1 is a block diagram schematically illustrating a power conversion device according to an embodiment.

FIG. 1 is a block diagram schematically illustrating a power conversion device according to an embodiment.

As illustrated in FIG. 1, the power conversion device 10 includes a major circuit part 12, a control device 14, a first measurement device 16, and a second measurement device 18. The major circuit part 12 performs power conversion. The control device 14 controls the power conversion by the major circuit part 12.

The major circuit part 12 is connected with a power system 2 and a power supply device 4. The power system 2 is a power system of alternating current. The AC power of the power system 2 is, for example, three-phase AC power. However, the AC power of the power system 2 may be single-phase AC power, etc. The power supply device 4 is, for example, a power storage device that uses a storage battery, etc. The power supply device 4 outputs DC power to the major circuit part 12.

For example, the major circuit part 12 converts the DC power input from the power supply device 4 into AC power corresponding to the power system 2 and outputs the AC power after the conversion to the power system 2, and charges the power supply device 4 by converting AC power input from the power system 2 into DC power. Thereby, the major circuit part 12 connects the power supply device 4 with the power system 2.

The power supply device 4 is not limited to a power storage device and may be, for example, a solar cell panel, etc. In such a case, the major circuit part 12 may not have the function of converting the AC power input from the power system 2 into DC power.

Also, the power supply device 4 may be, for example, another generator such as a wind power generator, a gas turbine generator, etc. The power that is input from the power supply device 4 to the major circuit part 12 is not limited to DC power and may be AC power. The major circuit part 12 may be configured to convert the AC power input from the power supply device 4 to other AC power corresponding to the power system 2. The power supply device 4 may be, for example, a different power system from the power system 2. The major circuit part 12 may be, for example, a frequency conversion device that connects two power systems of different frequencies, etc.

Thus, the power conversion by the major circuit part 12 is not limited to a conversion from direct current to alternating current and may be any conversion that converts the power of the power supply device 4 into AC power corresponding to the power system 2.

The major circuit part 12 includes a power conversion part 20 and a filter circuit 22. The power conversion part 20 converts power. The power conversion part 20 includes, for example, multiple switching elements and converts power by switching the multiple switching elements. The power conversion part 20 includes, for example, multiple switching elements having a three-phase bridge connection. The configuration of the power conversion part 20 may be any configuration that can convert the input power into AC power corresponding to the power system 2 by the switching of multiple switching elements, etc.

The filter circuit 22 is located at the alternating current side of the power conversion part 20. In other words, the filter circuit 22 is located between the power conversion part 20 and the power system 2. The filter circuit 22 causes the AC power output from the power conversion part 20 to approach a sine wave. For example, the filter circuit 22 causes the AC power output from the power conversion part 20 to approach a sine wave by suppressing high-frequency components included in the AC power output from the power conversion part 20.

The filter circuit 22 includes, for example, a reactor 24 connected in series to the AC output point of the power conversion part 20, and a capacitor 26 connected in parallel with the AC output point of the power conversion part 20. The reactor 24 and the capacitor 26 are provided for each phase of the AC power output from the power conversion part 20. However, the configuration of the filter circuit 22 is not limited thereto; any configuration that can cause the AC power output from the power conversion part 20 to approach a sine wave may be used.

The first measurement device 16 measures phase voltages Va(INV), Vb(INV), and Vc(INV) of the phases and line currents Ia(INV), Ib(INV), and Ic(INV) of the phases of the AC power output from the power conversion part 20 and inputs the measurement results to the control device 14.

The second measurement device 18 measures phase voltages Va(PCS), Vb(PCS), and Vc(PCS) of the phases and line currents Ia(PCS), Ib(PCS), and Ic(PCS) of the phases of the AC power output from the major circuit part 12 (the filter circuit 22), an active power P(PCS) at the output end of the major circuit part 12, and a reactive power Q(PCS) at the output end of the major circuit part 12 and inputs the measurement results to the control device 14.

The control device 14 controls the power conversion by the major circuit part 12 by controlling the operation of the power conversion part 20. In other words, the control device 14 controls the switching of the multiple switching elements of the power conversion part 20.

The control device 14 receives the input of the measurement results of the first measurement device 16 and the second measurement device 18 and receives the input of an active power command value and a reactive power command value of the AC power output from the major circuit part 12 from a higher-level controller, etc.

The control device 14 controls the operation of the power conversion part 20 based on the measurement results input from the first measurement device 16 and the second measurement device 18 and the active power command value and the reactive power command value input from the higher-level controller, etc.

More specifically, the control device 14 calculates instantaneous value voltage output command values Va(ref), Vb(ref), and Vc(ref) of the phases of the AC power output from the power conversion part 20 based on the reactive power command value, the active power command value, and the measurement results that are input, and controls the operation of the power conversion part 20 so that voltages corresponding to the calculated instantaneous value voltage output command values Va(ref), Vb(ref), and Vc(ref) are output from the power conversion part 20.

Thus, the control device 14 controls the output voltage of the major circuit part 12. The control device 14 performs a voltage-controlled operation of the major circuit part 12. The measurement results are not limited to being directly input to the control device 14 from the first measurement device 16 and the second measurement device 18 and may be input to the control device 14 via, for example, a higher-level controller, etc.

Also, the measured value of the active power P(PCS) at the output end of the major circuit part 12 and the measured value of the reactive power Q(PCS) at the output end of the major circuit part 12 are not limited to being input to the control device 14 from the second measurement device 18 and may be determined by, for example, calculating in the control device 14 based on the measured values of the phase voltages Va(PCS), Vb(PCS), and Vc(PCS) of the phases and the line currents Ia(PCS), Ib(PCS), and Ic(PCS) of the phases. The second measurement device 18 may not always measure the active power P(PCS) and the reactive power Q(PCS).

The control device 14 includes a command value calculation part 30 and an overcurrent suppression controller 32. The command value calculation part 30 receives the input of an active power command value and a reactive power command value input from a higher-level controller or the like and receives the input of the measured values of the active power P(PCS) and the reactive power Q(PCS) measured by the second measurement device 18.

The command value calculation part 30 calculates a phase voltage phase command value θ of the AC power output from the major circuit part 12 based on the active power command value and the measured value of the active power P(PCS). Also, the command value calculation part 30 calculates a phase voltage amplitude command value |V| of the AC power output from the major circuit part 12 based on the reactive power command value and the measured value of the reactive power Q(PCS). The command value calculation part 30 inputs the calculated phase voltage phase command value θ and phase voltage amplitude command value |V| to the overcurrent suppression controller 32. It is sufficient to use a well-known calculation method to calculate the phase voltage phase command value θ and the phase voltage amplitude command value |V|.

The overcurrent suppression controller 32 receives the input of the phase voltage phase command value θ and the phase voltage amplitude command value |V| from the command value calculation part 30 and receives the input of the phase voltages Va(INV), Vb(INV), and Vc(INV) and the line currents Ia(INV), Ib(INV), and Ic(INV) measured by the first measurement device 16 and the measured values of the phase voltages Va(PCS), Vb(PCS), and Vc(PCS) and the line currents Ia(PCS), Ib(PCS), and Ic(PCS) measured by the second measurement device 18.

The overcurrent suppression controller 32 calculates the instantaneous value voltage output command values Va(ref), Vb(ref), and Vc(ref) to suppress the overcurrent at the output end of the major circuit part 12 by using all of the input information of the phase voltage phase command value θ, the phase voltage amplitude command value |V|, the phase voltages Va(INV), Vb(INV), and Vc(INV), the line currents Ia(INV), Ib(INV), and Ic(INV), the phase voltages Va(PCS), Vb(PCS), and Vc(PCS), and the line currents Ia(PCS), Ib(PCS), and Ic(PCS).

Figure 2:
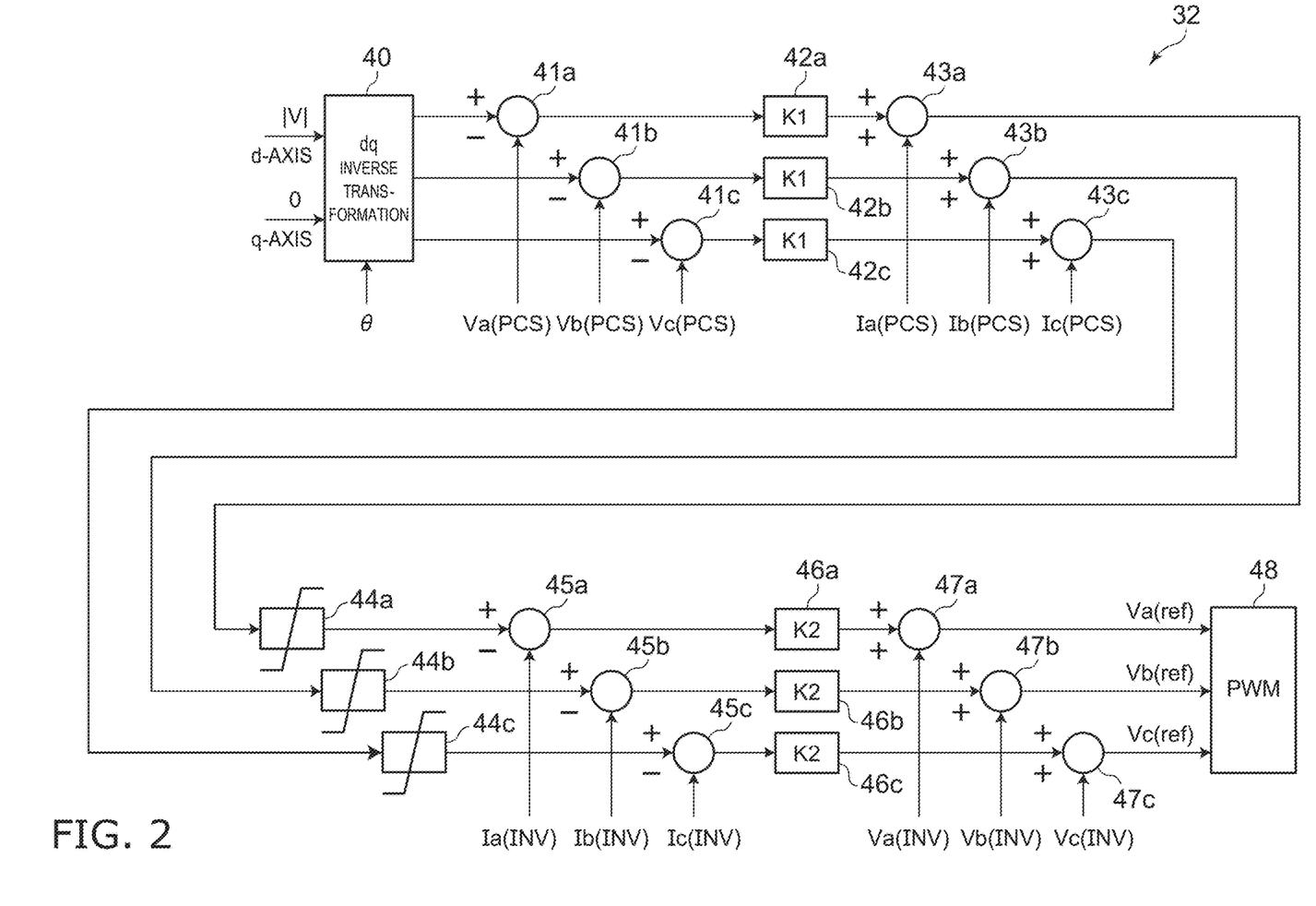
FIG. 2 is a block diagram schematically illustrating the overcurrent suppression controller according to the embodiment.

FIG. 2 is a block diagram schematically illustrating the overcurrent suppression controller according to the embodiment.

As illustrated in FIG. 2, the overcurrent suppression controller 32 includes a dq inverse transformation part 40, the first subtractors 41a to 41c, the first arithmetic units 42a to 42c, the first adders 43a to 43c, the limiters 44a to 44c, the second subtractors 45a to 45c, the second arithmetic units 46a to 46c, the second adders 47a to 47c, and the control signal generator 48.

The phase voltage phase command value θ and the phase voltage amplitude command value |V| are input to the dq inverse transformation part 40. The phase voltage amplitude command value |V| is input to the dq inverse transformation part 40 as a voltage signal of the d-axis component. Also, "0" is input as a voltage signal of the q-axis component to the dq inverse transformation part 40. The dq inverse transformation part 40 performs a dq inverse transformation (an inverse park transform) of the phase voltage phase command value θ, the phase voltage amplitude command value |V|, and the voltage signal of the q-axis component that are input. Thereby, the dq inverse transformation part 40 calculates command values of the instantaneous value voltages of the phases of the AC power output from the major circuit part 12 based on the phase voltage phase command value θ and the phase voltage amplitude command value |V|. Then, the dq inverse transformation part 40 inputs the calculated command values of the instantaneous value voltages to the first subtractors 41a to 41c.

The first subtractors 41a to 41c receive the input of the command values of the instantaneous value voltages of the phases from the dq inverse transformation part 40 and receive the input of the measured values of the phase voltages Va(PCS), Vb(PCS), and Vc(PCS) of the phases measured by the second measurement device 18.

The first subtractors 41a to 41c calculate the differences between the command values of the instantaneous value voltages of the phases and the measured values of the phase voltages Va(PCS), Vb(PCS), and Vc(PCS) of the phases by subtracting the measured values of the phase voltages Va(PCS), Vb(PCS), and Vc(PCS) of the phases from the command values of the instantaneous value voltages of the phases.

The first arithmetic units 42a to 42c calculate correction values to cause the phase voltages Va(PCS), Vb(PCS), and Vc(PCS) of the phases to approach the command values of the instantaneous value voltages of the phases by multiplying the differences calculated by the first subtractors 41a to 41c by a first proportionality constant K1. More specifically, the correction values are correction values of the line currents Ia(PCS), Ib(PCS), and Ic(PCS) of the phases of the AC power output from the major circuit part 12. The first arithmetic units 42a to 42c input the calculated correction values to the first adders 43a to 43c.

The first adders 43a to 43c receive the input of the correction values from the first arithmetic units 42a to 42c and receive the input of the measured values of the line currents Ia(PCS), Ib(PCS), and Ic(PCS) of the phases measured by the second measurement device 18.

The first adders 43a to 43c add the correction values to the measured values of the line currents Ia(PCS), Ib(PCS), and Ic(PCS) of the phases. Thereby, the first adders 43a to 43c calculate command values of the line currents Ia(PCS), Ib(PCS), and Ic(PCS) of the phases of the major circuit part 12 necessary to cause the phase voltages Va(PCS), Vb(PCS), and Vc(PCS) of the phases of the AC power output from the major circuit part 12 to approach the instantaneous value voltage output command values of the phases. The first adders 43a to 43c input the calculated command values of the line currents Ia(PCS), Ib(PCS), and Ic(PCS) of the phases to the limiters 44a to 44c.

When the command values of the line currents Ia(PCS), Ib(PCS), and Ic(PCS) of the phases that are input are not less than an upper limit, the limiters 44a to 44c limit the command values of the line currents Ia(PCS), Ib(PCS), and Ic(PCS) of the phases to the upper limit; and when the command values of the line currents Ia(PCS), Ib(PCS), and Ic(PCS) of the phases that are input are not more than a lower limit, the limiters 44a to 44c limit the command values of the line currents Ia(PCS), Ib(PCS), and Ic(PCS) of the phases to the lower limit.

When the command values that are input are greater than the lower limit and less than the upper limit, the limiters 44a to 44c input the command values that are input as-is to the second subtractors 45a to 45c. When the command values that are input are not more than the lower limit, the limiters 44a to 44c limit the command values to the lower limit and input the command values after the limiting to the second subtractors 45a to 45c. Also, when the command values that are input are not less than the upper limit, the limiters 44a to 44c limit the command values to the upper limit and input the command values after the limiting to the second subtractors 45a to 45c. Thereby, the limiters 44a to 44c suppress the undesirable generation of an overcurrent in the major circuit part 12 due to an instantaneous potential difference occurring due to an abrupt change of the system voltage of the power system 2, etc.

The second subtractors 45a to 45c receive the input of the command values of the line currents Ia(PCS), Ib(PCS), and Ic(PCS) of the phases from the limiters 44a to 44c and receive the input of the measured values of the line currents Ia(INV), Ib(INV), and Ic(INV) of the phases of the power conversion part 20 measured by the first measurement device 16.

The second subtractors 45a to 45c calculate the differences between the command values of the line currents Ia(PCS), Ib(PCS), and Ic(PCS) of the phases and the measured values of the line currents Ia(INV), Ib(INV), and Ic(INV) of the phases by subtracting the measured values of the line currents Ia(INV), Ib(INV), and Ic(INV) of the phases from the command values of the line currents Ia(PCS), Ib(PCS), and Ic(PCS) of the phases.

The second arithmetic units 46a to 46c calculate the correction values for outputting currents corresponding to the command values of the line currents Ia(PCS), Ib(PCS), and Ic(PCS) of the phases from the power conversion part 20 by multiplying the differences calculated by the second subtractors 45a to 45c by a second proportionality constant K2. More specifically, the correction values are correction values of the phase voltages Va(INV), Vb(INV), and Vc(INV) of the phases of the AC power output from the power conversion part 20. The second arithmetic units 46a to 46c input the calculated correction values to the second adders 47a to 47c.

The second adders 47a to 47c receive the input of the correction values from the second arithmetic units 46a to 46c and receive the input of the measured values of the phase voltages Va(INV), Vb(INV), and Vc(INV) of the phases of the power conversion part 20 measured by the first measurement device 16.

The second adders 47a to 47c add the correction values to the measured values of the phase voltages Va(INV), Vb(INV), and Vc(INV) of the phases. Thereby, the second adders 47a to 47c calculate the instantaneous value voltage output command values Va(ref), Vb(ref), and Vc(ref) of the phases of the AC power output from the power conversion part 20.

Thereby, in the overcurrent suppression controller 32, the instantaneous value voltage output command values Va(ref), Vb(ref), and Vc(ref) can be calculated to suppress the overcurrent at the output end of the major circuit part 12 by using all of the input information of the phase voltage phase command value θ, the phase voltage amplitude command value |V|, the phase voltages Va(INV), Vb(INV), and Vc(INV), the line currents Ia(INV), Ib(INV), and Ic(INV), the phase voltages Va(PCS), Vb(PCS), and Vc(PCS), and the line currents Ia(PCS), Ib(PCS), and Ic(PCS).

In the overcurrent suppression controller 32, the instantaneous value voltage output command values Va(ref), Vb(ref), and Vc(ref) can be calculated to suppress the overcurrent at the output end of the major circuit part 12 by the limiters 44a to 44c limiting the command values of the line currents Ia(PCS), Ib(PCS), and Ic(PCS) of the phases of the AC power output from the major circuit part 12 to be between the lower limit and the upper limit.

The second adders 47a to 47c input the calculated instantaneous value voltage output command values Va(ref), Vb(ref), and Vc(ref) of the phases to the control signal generator 48.

The control signal generator 48 generates a control signal for outputting, from the power conversion part 20, voltages corresponding to the instantaneous value voltage output command values Va(ref), Vb(ref), and Vc(ref) of the phases input from the second adders 47a to 47c and inputs the generated control signal to the power conversion part 20. Thereby, the control signal generator 48 outputs the voltages corresponding to the instantaneous value voltage output command values Va(ref), Vb(ref), and Vc(ref) of the phases to the power conversion part 20.

For example, the control signal generator 48 generates the control signal for controlling the switching of the switching elements of the power conversion part 20 by performing sine wave pulse width modulation control based on the instantaneous value voltage output command values Va(ref), Vb(ref), and Vc(ref) of the phases. However, the configuration of the control signal generator 48 is not limited thereto and may be any configuration that can generate the control signal for outputting the voltages corresponding to the instantaneous value voltage output command values Va(ref), Vb(ref), and Vc(ref) of the phases from the power conversion part 20.

For example, a configuration may be used in which the control signal generator 48 is located at the major circuit part 12 side; the instantaneous value voltage output command values Va(ref), Vb(ref), and Vc(ref) of the phases are input to the major circuit part 12 from the control device 14 (the overcurrent suppression controller 32); and the control signal is generated at the major circuit part 12 side. The overcurrent suppression controller 32 may not always include the control signal generator 48. The configuration of the overcurrent suppression controller 32 is not limited to the configuration described above and may be any configuration that can calculate the instantaneous value voltage output command values Va(ref), Vb(ref), and Vc(ref) to suppress the overcurrent at the output end of the major circuit part 12 by using all of the input information.

Figure 3:
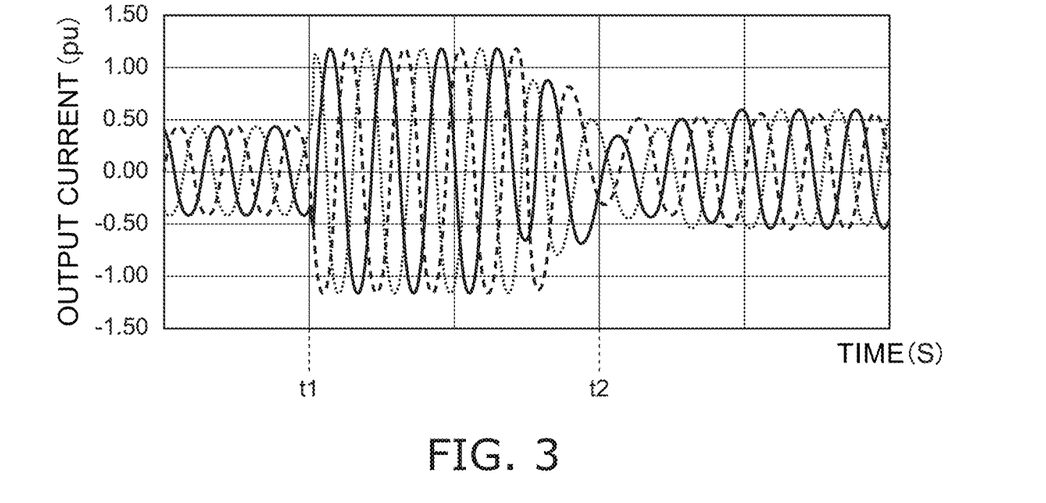
FIG. 3 is a graph schematically illustrating an example of the operation of the power conversion device according to the embodiment.

FIG. 3 is a graph schematically illustrating an example of the operation of the power conversion device according to the embodiment.

Figure 4:
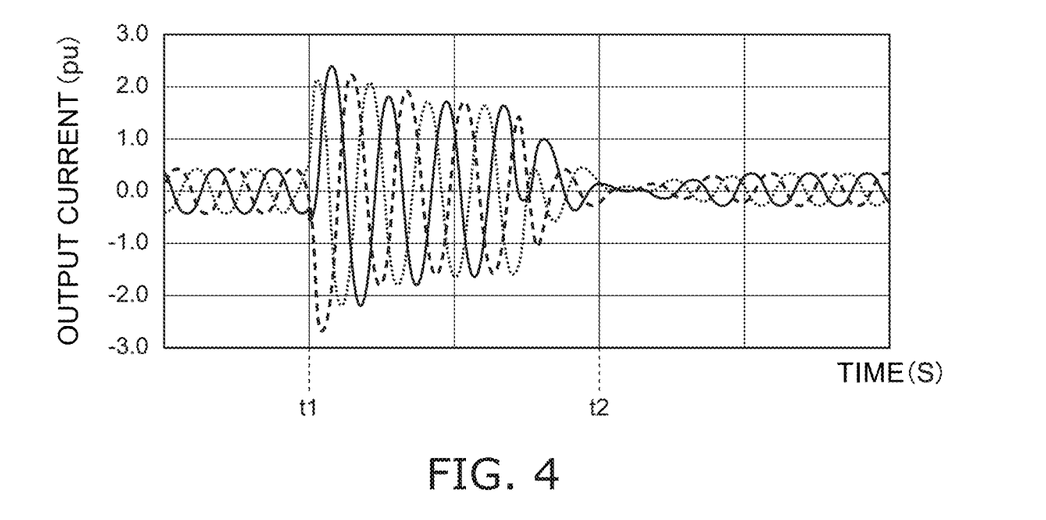
FIG. 4 is a graph schematically illustrating an example of the operation of a reference power conversion device.

FIG. 4 is a graph schematically illustrating an example of the operation of a reference power conversion device.

FIG. 4 schematically illustrates an example of the operation of the reference power conversion device in which the control device 14 does not include the overcurrent suppression controller 32.

In FIGS. 3 and 4, the horizontal axis is the time (seconds), and the vertical axis is the output current (pu: per unit) referenced to the rated output of the major circuit part 12.

FIG. 3 illustrates an example of the operation of the power conversion device 10 when a three-wire ground fault having a fault point residual voltage of about 50% occurred from time t1 to t2. FIG. 4 illustrates an example of the operation of the reference power conversion device for a similar case.

As illustrated in FIG. 4, in the reference power conversion device that does not include the overcurrent suppression controller 32, the output current of the major circuit part 12 exceeded±2 (pu) when the fault occurred.

In contrast, in the power conversion device 10 according to the embodiment, the upper limit is set to +1.2 (pu) and the lower limit is set to −1.2 (pu) in the limiters 44a to 44c of the overcurrent suppression controller 32. Thereby, in the power conversion device 10 according to the embodiment as illustrated in FIG. 3, the output current of the major circuit part 12 was suppressed to about ±1.2 (pu) even when the fault occurred. Compared to the reference power conversion device that does not include the overcurrent suppression controller 32, the generation of the overcurrent can be suppressed in the power conversion device 10 even when the fault occurs.

In the power conversion device 10 according to the embodiment as described above, the control device 14 includes the overcurrent suppression controller 32. Thereby, the generation of the overcurrent can be suppressed even when a voltage-controlled operation is performed. For example, the generation of the overcurrent in the major circuit part 12 and the undesirable failure of components inside the major circuit part 12 such as the switching elements of the power conversion part 20, etc., can be suppressed even when an instantaneous potential difference is generated by an abrupt change of the system voltage, etc.

Although several embodiments of the invention are described, these embodiments are presented as examples and are not intended to limit the scope of the invention. These novel embodiments may be carried out in other various forms; and various omissions, substitutions, and modifications can be performed without departing from the spirit of the invention. Such embodiments and their modifications are within the scope and spirit of the invention and are included in the invention described in the claims and their equivalents.

The invention claimed is:

1. A power conversion device, comprising:
a major circuit part including
a power conversion part converting, into alternating current power, power that is input, and
a filter circuit causing the alternating current power output from the power conversion part to approach a sine wave;
a control device controlling power conversion by the major circuit part by controlling an operation of the power conversion part;
a first measurement device measuring a line current of each phase and a phase voltage of each phase of the alternating current power output from the power conversion part; and
a second measurement device measuring a line current of each phase and a phase voltage of each phase of alternating current power output from the major circuit part, active power at an output end of the major circuit part, and reactive power at the output end of the major circuit part,
the control device including
a command value calculation part receiving input of an active power command value and a reactive power command value and receiving input of measured values of the active power and the reactive power of the output end of the major circuit part, the command value calculation part calculating a phase voltage phase command value of the alternating current power output from the major circuit part based on the active power command value and the measured value of the active power, the command value calculation part calculating a phase voltage amplitude command value of the alternating current power output from the major circuit part based on the reactive power command value and the measured value of the reactive power, and
an overcurrent suppression controller calculating instantaneous value voltage output command values of the phases of the alternating current power output from the power conversion part to suppress an overcurrent at the output end of the major circuit part by using all input information of the phase voltage phase command value, the phase voltage amplitude command value, the measured values of the phase voltages and the line currents of the alternating current power of the power conversion part, and the measured values of the phase voltages and the line currents of the alternating current power of the major circuit part,
the control device controlling the operation of the power conversion part so that voltages corresponding to the calculated instantaneous value voltage output command values are output from the power conversion part.

2. The power conversion device according to claim 1, wherein
the overcurrent suppression controller includes:
a dq inverse transformation part calculating command values of instantaneous value voltages of the phases of the alternating current power output from the major circuit part by performing a dq inverse transformation based on the phase voltage phase command value and the phase voltage amplitude command value;
a first subtractor calculating differences between the calculated command values of the instantaneous value voltages of the phases and the measured values of the phase voltages of the phases of the alternating current power of the major circuit part;
a first arithmetic unit calculating correction values of the line currents of the phases of the alternating current power output from the major circuit part by multiplying the differences calculated by the first subtractor by a first proportionality constant;
a first adder calculating command values of the line currents of the phases of the alternating current power of the major circuit part by adding the correction values calculated by the first arithmetic unit to the measured values of the line currents of the phases of the alternating current power of the major circuit part;
a limiter limiting the command values of the line currents of the phases to an upper limit when the command values of the line currents of the phases are not less than the upper limit, and limiting the command values of the line currents of the phases to a lower limit when the command values of the line currents of the phases are not more than the lower limit;
a second subtractor calculating differences between the command values of the line currents of the phases input from the limiter and the measured values of the line currents of the phases of the power conversion part;
a second arithmetic unit calculating correction values of the phase voltages of the phases of the alternating current power output from the power conversion part by multiplying the differences calculated by the second subtractor by a second proportionality constant; and
a second adder calculating the instantaneous value voltage output command values of the phases of the alternating current power output from the power conversion part by adding the correction values calculated by the second arithmetic unit to the measured values of the phase voltages of the phases of the alternating current power of the power conversion part.

3. A control device used in a power conversion device, the power conversion device including a major circuit part, the major circuit part including:
- a power conversion part converting, into alternating current power, power that is input; and
- a filter circuit causing the alternating current power output from the power conversion part to approach a sine wave, the control device controlling power conversion by the major circuit part by controlling an operation of the power conversion part, the control device comprising:
- a command value calculation part receiving input of an active power command value and a reactive power command value and receiving input of measured values of active power and reactive power of an output end of the major circuit part, the command value calculation part calculating a phase voltage phase command value of the alternating current power output from the major circuit part based on the active power command value and the measured value of the active power, the command value calculation part calculating a phase voltage amplitude command value of the alternating current power output from the major circuit part based on the reactive power command value and the measured value of the reactive power; and
- an overcurrent suppression controller calculating instantaneous value voltage output command values of the phases of the alternating current power output from the power conversion part to suppress an overcurrent at the output end of the major circuit part by using all of input information of the phase voltage phase command value, the phase voltage amplitude command value, the measured values of the phase voltages and the line currents of the alternating current power of the power conversion part, and the measured values of the phase voltages and the line currents of the alternating current power of the major circuit part, the control device controlling the operation of the power conversion part so that voltages corresponding to the calculated instantaneous value voltage output command values are output from the power conversion part.

* * * * *